United States Patent
Sajja et al.

(10) Patent No.: US 10,469,478 B2
(45) Date of Patent: Nov. 5, 2019

(54) INTER-APPLICATION SECURE DATA SHARING WORKFLOW

(71) Applicant: VMware, Inc., Palo Alto, CA (US)

(72) Inventors: Kishore Sajja, Atlanta, GA (US); Lucas Chen, Atlanta, GA (US); Raghuram Rajan, Atlanta, GA (US); Anuj Panwar, Atlanta, GA (US); Sandeep Naga Kaipu, Atlanta, GA (US); Rajiv Singh, Atlanta, GA (US)

(73) Assignee: VMWARE, INC., Palo Alto, CA (US)

(*) Notice: Subject to any disclaimer, the term of this patent is extended or adjusted under 35 U.S.C. 154(b) by 93 days.

(21) Appl. No.: 15/442,239

(22) Filed: Feb. 24, 2017

(65) Prior Publication Data
US 2018/0157433 A1 Jun. 7, 2018

Related U.S. Application Data

(60) Provisional application No. 62/431,174, filed on Dec. 7, 2016.

(51) Int. Cl.
*H04L 9/08* (2006.01)
*H04L 29/06* (2006.01)
*G06F 3/06* (2006.01)

(52) U.S. Cl.
CPC .......... *H04L 63/0815* (2013.01); *G06F 3/067* (2013.01); *G06F 3/0622* (2013.01); *G06F 3/0659* (2013.01); *H04L 9/0825* (2013.01); *H04L 9/0894* (2013.01); *H04L 63/0442* (2013.01)

(58) Field of Classification Search
CPC ..... H04L 63/0815; H04L 9/0894; H04L 9/30; H04L 9/14; H04L 9/0861; H04L 9/0822; H04L 9/32; G06F 3/0659; G06F 3/067; G06F 3/0622
See application file for complete search history.

(56) References Cited

U.S. PATENT DOCUMENTS

| | | | |
|---|---|---|---|
| 2012/0036360 A1* | 2/2012 | Bassu | H04L 9/3228 713/168 |
| 2015/0310188 A1* | 10/2015 | Ford | G06F 21/10 726/28 |
| 2016/0191499 A1 | 6/2016 | Momchilov et al. | |

OTHER PUBLICATIONS

Office Action mailed for U.S. Appl. No. 15/442,175.

* cited by examiner

*Primary Examiner* — Khoi V Le
(74) *Attorney, Agent, or Firm* — Thomas | Horstemeyer, LLP; Arvind R. Reddy; Jason M. Perilla

(57) ABSTRACT

To extend a sign on session among applications, an inter-application workflow request can be initiated from a first to a second application. The workflow request can identify one or more memory locations in a shared memory for secure data transfer between the applications. The first application can then monitor the memory locations for the presence of a public key stored in shared memory by the second application in response to the workflow request. Once the public key is present in the shared memory, the first application can retrieve and use it to encrypt an access interval key. The encrypted access interval key can then be stored in the shared memory for retrieval by the second application. The access interval key is associated with a sign on session of the first application, and the second application can retrieve and decrypt it to extend the sign on session to the second application.

20 Claims, 6 Drawing Sheets

| | Identifier | Data Element | Notes |
|---|---|---|---|
| | EnMKey | {Mkey}Ikey — 200 | Master Key Encrypted by Access Interval Key |
| | EnMKey | {Mkey}SKey — 201 | Master Key Encrypted by Session Key |
| Shared Data Elements 210 | Data1 | {Data1}MKey — 211 | Data Element Encrypted by Master Key |
| | Data2 | {Data2}MKey — 212 | Data Element Encrypted by Master Key |
| | ⋮ | ⋮ | ⋮ |
| | DataN | {Data2}MKey — 21N | Data Element Encrypted by Master Key |
| SSO Session Map 220 | SSOTime | SSOTime — 230 | Start/End Time of Current SSO Session |
| | A1PK | $A1_{Pubkey}$ — 241 | Public Key of 1st Application |
| | A1EnIKey | {IKey}$A1_{Pubkey}$ — 251 | Access Interval Key Encrypted by Public Key of 1st Application |
| | A2PK | $A2_{Pubkey}$ — 242 | Public Key of 2nd Application |
| | A2EnIKey | {IKey}$A2_{Pubkey}$ — 252 | Access Interval Key Encrypted by Public Key of 2nd Application |
| | ⋮ | ⋮ | ⋮ |
| | AnPK | $An_{Pubkey}$ — 24N | Public Key of nth Application |
| | AnEnIKey | {IKey}$An_{Pubkey}$ — 25N | Access Interval Key Encrypted by Public Key of nth Application |
| Key Pair Map 260 | EnA1KeyP | {A1KeyP}Key — 271 | Encrypted Key Pair of 1st Application |
| | ⋮ | ⋮ | |
| | EnAnKeyP | {AnKeyP}Key — 27N | Encrypted Key Pair of nth Application |

INTER-APPLICATION SECURE DATA SHARING WORKFLOW

CROSS-REFERENCE TO RELATED APPLICATIONS

This application claims the benefit of U.S. Provisional Application No. 62/431,174, filed Dec. 7, 2016, the entire contents of which is hereby incorporated herein by reference. This application is also related to U.S. Non-Provisional Application No. 15/442,175, filed concurrently herewith, the entire contents of which is hereby incorporated herein by reference.

BACKGROUND

Mobile devices are being adopted for access to enterprise computing systems and resources. With the growing number of different mobile devices, platforms, and operating systems available for adoption, certain challenges arise in the management of large numbers of mobile devices for many users. With the number of different platforms available, providing mobile device access to computing resources can introduce a significant threat to enterprise computing system security.

Mobile device management platforms can be relied upon to facilitate certain challenges associated with the management of large numbers of mobile devices using a central administration console. For example, the distribution, installation, and access to a suite of applications on a number of mobile devices can be managed using the administration console. Further, through the administration of the suite of applications, access to the functions performed and data processed by the applications can be managed based on a set of management policies, compliance rules, and configuration data which is defined and enforced by the administration console. Among other operating characteristics, the management policies, compliance rules, and configuration data can define an authentication mode relied upon by mobile devices for access to the functions performed and data processed by the suite of applications, individually or collectively for the applications.

For a suite of applications installed on a mobile device, a single sign on (SSO) service can be used to permit a user of the mobile device to use a single login credential or access code (e.g., name and password, pin number, biometric identifier, etc.) to gain access rights to the applications. The SSO service authenticates users for access to the applications and, potentially, eliminates the need for additional authentication prompts when the user switches between applications—at least for a limited period of time. SSO services can also be helpful for logging user activities and monitoring user accounts.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIG. 2 illustrates example data elements stored in a shared memory of the client device of the networked environment shown in FIG. 1 according to various examples described herein.

DETAILED DESCRIPTION

Figure 1:
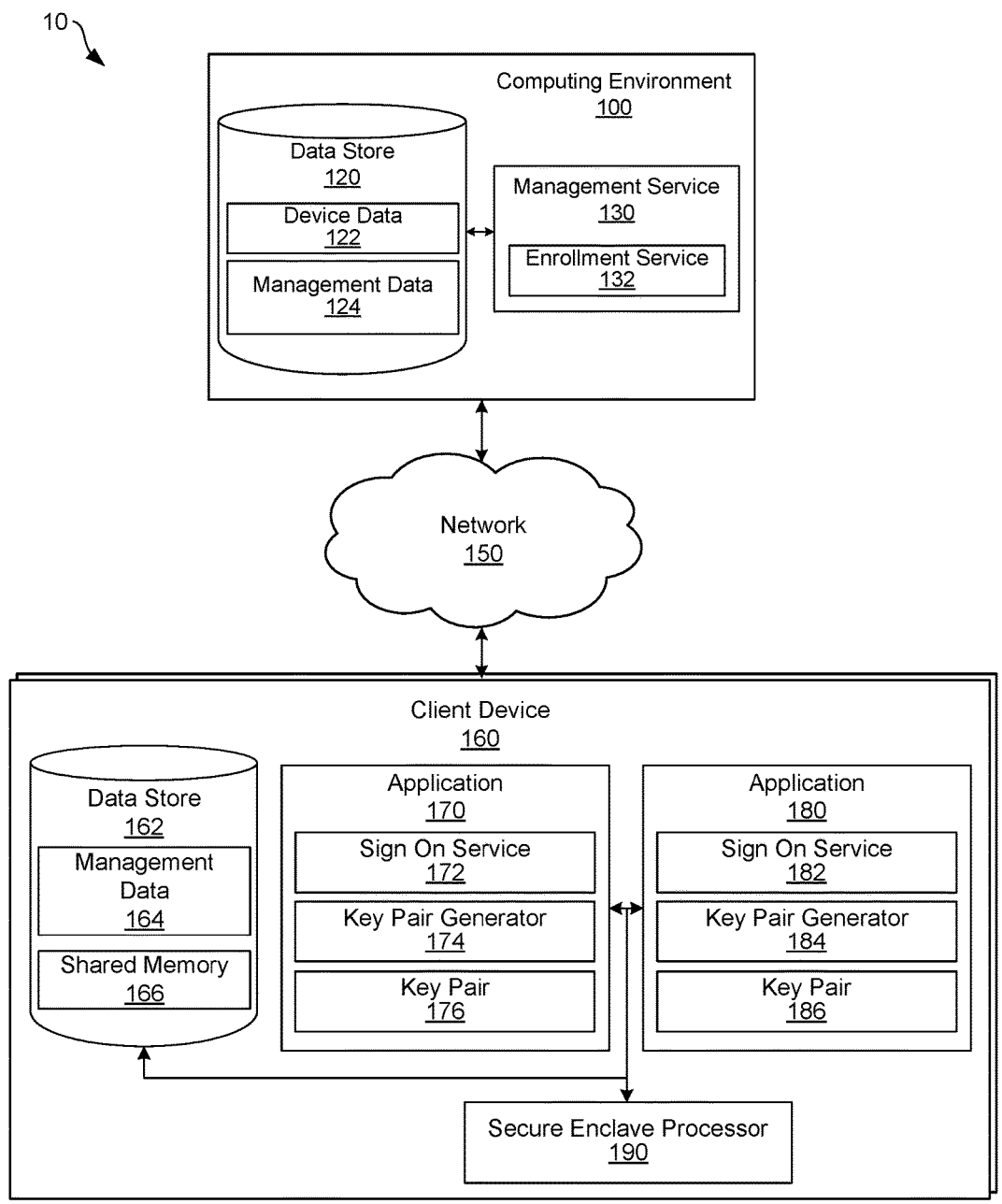
FIG. 1 illustrates an example networked environment for secure inter-application data sharing according to various examples described herein.

With a single sign on (SSO) service, a single login credential or access code can be used to grant access rights to a number of different applications. An SSO service can be particularly useful to enable inter-application workflows among a number of different applications. A suite of SSO-enabled applications, for example, can be identified through a digital certificate, digital signature, or other techniques, to identify that the SSO-enabled applications were developed by the same developer using a common software development kit. Especially among such SSO-enabled applications, it can be desirable to facilitate inter-application workflows.

As one example of an inter-application workflow, a user might view an e-mail in an e-mail application, open a link in an e-mail in the e-mail application, and expect a browser application to retrieve a network page based on the link. From a user-experience point of view, it would be beneficial to avoid the need to separately provide the same login credential to both the e-mail and browser applications in the inter-application workflow. In part, SSO services can rely upon the secure transfer of tokens, certificates, application keys, account information, and other data between the SSO-enabled applications.

To achieve SSO service and other secure inter-application data sharing features, the operating system of a client device can establish a shared memory area (e.g., a keychain) when a first application among a suite of SSO-enabled applications is installed (or first executed or configured) on the client device. The shared memory can be accessed by each of the SSO-enabled applications to transfer data among each other. For example, the shared memory can be used to share tokens, certificates, application keys, account information, and other data between the SSO-enabled applications.

Particularly in the case where the operating system of a client device offers no other way for applications to share sensitive data among each other, the shared memory offers a data-sharing resource for the applications. It can be a security concern, however, if application developers are permitted to store plaintext encryption keys in the shared memory. Thus, when the shared memory is established, a cryptographically-strong master key can be generated by a random number generation service of the operating system executing on the client device. The master key can be made available to the SSO-enabled applications, and those applications can use the master key to encrypt data before it is stored in the shared memory to protect the shared data against access by other (i.e., non-SSO-enabled) processes executing on the client device. The master key is not stored anywhere on the client device in plaintext form because processes having access to the master key can unlock or access the contents of the shared memory (e.g., which may also depend upon whether access to the shared memory is permitted by the operating system of the client device).

To protect the master key from unauthorized use, the first application installed on the client device can also configure SSO access for the SSO-enabled applications based on a predefined authentication mode. The authentication mode, which can be specified through a device management platform, can define a session time during which any particular SSO session is valid and also specify the type of access credentials required to start and authenticate an SSO session.

Depending upon the authentication mode, the access credentials required to authenticate and start an SSO session can be a user's username and password, PIN number, biometric identifier, or other access code or credentials. In response to a valid entry of the user's access code, a crypt key is generated. The crypt key can be generated by a key derivative function using the user's access code as a seed to the key derivative function or using another key generation function or process. At least one instance of the master key encrypted by the crypt key is stored in the shared memory, and the regeneration of the crypt key permits access to the master key (e.g., because it can be used to decrypt the master key using the crypt key). In that case, the crypt key can be securely shared between SSO-enabled applications so that they can access the master key.

Between SSO-enabled applications, the session information (e.g., session start time, session length, etc.) and the crypt key can be shared so that, after a user enters the SSO access code when launching the first SSO-enabled application on the client device, other SSO-enabled applications can also use the same crypt key as long as the session is still valid. To that end, the session information and the crypt key can be stored in the shared memory for access and use by the SSO-enabled applications. After the session has expired, any of the SSO-enabled applications can delete or clear the session information and the crypt key from the shared memory. Without access to the crypt key (which is used to encrypt and decrypt the master key), the SSO-enabled applications cannot decrypt or use the master key. In extension, without access to the master key, the SSO-enabled applications cannot decrypt any data elements stored in the shared memory and can be locked against use.

Storing the crypt key in plaintext form, just like storing the master key in plaintext form, can also present a security concern. Thus, to protect the crypt key, when an SSO session is started and the crypt key generated, a boot time key can also be generated using a key derivative function. The boot time key can be generated by reading the boot time of the client device (e.g., using sysctl) and using the boot time as a seed for a key derivative function. In turn, the crypt key can be encrypted by the boot time key, and the encrypted crypt key can be stored in the shared memory. Thus, when an SSO-enabled application seeks access to the contents of the shared memory, it first checks whether the current SSO session is valid. If so, the SSO-enabled application generates the boot time key to decrypt the crypt key and, ultimately, decrypts the master key using the crypt key to access the contents of the shared memory. However, the use of the system boot time of the client device to generate the boot time key also presents a security risk because the boot time of the client device can be known, discovered, or estimated.

In the context presented above, according to one of the examples described herein, a number of SSO-enabled applications can generate an access interval key and securely distribute it among each other during a current, valid SSO session using asymmetric key pairs, and the boot time key is not used. In one example, a user is prompted by an application for an access code to establish an SSO session among SSO-enabled applications. Depending upon the authentication mode, the access credentials required to authenticate and start an SSO session can be a user's username and password, PIN number, biometric identifier, or other access code or credentials.

In response to a valid entry of the user's access code, an access interval key can be generated. In various cases, the access interval key can be any suitable cryptographically-strong key for encrypting the master key. The access interval key can be generated using any suitable key generation function or process. For example, the access interval key can be a crypt key generated by a key derivative function using the user's access code as a seed to the key derivative function. In that case, the master key is encrypted by the crypt key and at least one instance of that encrypted master key is stored in the shared memory. In this case, the regeneration of the crypt key by the key derivative function permits access to the master key (e.g., because the crypt key can be used to decrypt the master key). The access interval key, which is the crypt key in this case, can be securely shared between SSO-enabled applications using asymmetric key pairs so that the applications can access the master key.

In another case, after the user's access code is determined to be valid, the crypt key can be generated by a key derivative function using the user's access code, but the crypt key is not used as the access interval key. Instead, the master key can be encrypted by the crypt key and at least one instance of that crypt-key-encrypted master key can be stored in the shared memory. A cryptographically-strong session key can also be generated by a random number generation service of the client device in this case, and the session key can be used as the access interval key. In this scenario, the master key can also be encrypted by the session key and at least one instance of that session-key-encrypted master key can also stored in the shared memory. Here, the regeneration of the session key by the random number generation service of the client device permits access to the master key (e.g., because the session key can be used to decrypt the master key). The access interval key, which is the session key in this case, can be securely shared between the SSO-enabled applications using asymmetric key pairs so that the applications can access the master key.

In either case, once decrypted using the access interval key, the master key can be used to encrypt and decrypt the contents of the shared memory. To securely distribute the access interval key among the SSO-enabled applications during the current SSO session, individual SSO-enabled applications each store a public key of a respective asymmetric key pair in the shared memory. The access interval key is encrypted, respectively, by the public keys of the SSO-enabled applications and stored in the shared memory. In turn, each of the SSO-enabled applications can retrieve its encrypted access interval key (e.g., a copy of the access interval key encrypted by its public key) from the shared memory and decrypt the encrypted access interval key using a private key of the asymmetric key pair of the SSO-enabled application.

During use, each of the SSO-enabled applications can check to determine whether the current SSO session is still valid according to a device management policy or rule, for example. If not, one of the applications can delete or clear all instances of the encrypted access interval key (i.e., access interval key encrypted by the public keys of the SSO-enabled applications) and any instances of the master key encrypted by the access interval key that are stored in the shared memory. By clearing the instances of the encrypted access interval key stored in the shared memory, the SSO-enabled applications cannot decrypt the master key or access the contents of the shared memory.

Thus, when the current SSO session ends, it might be necessary for the next-launched SSO-enabled application to prompt a user of the client device for the access code to regenerate the access interval key. Once the access interval key is regenerated, the application can encrypt the access interval key by the public keys of the other SSO-enabled applications in the shared memory, and store the encrypted access interval keys in the shared memory to establish a new SSO session. These and other aspects of the concepts of secure asymmetric key application data sharing are described in further detail below.

According to another example described herein, an inter-application workflow request can be initiated from a first to a second application to extend a sign on session from the first to the second application. The workflow request can identify one or more memory locations in a shared memory for secure data transfer between the applications. The first application can then monitor the memory locations for the presence of a public key stored in shared memory by the second application in response to the workflow request. Once the public key is present in the shared memory, the first application can retrieve and use it to encrypt an access interval or other key. The encrypted key can then be stored in the shared memory for retrieval by the second application. The key is associated with a sign on session of the first application, and the second application can retrieve and decrypt it to access encrypted data elements in the shared memory and extend the sign on session from the first application to the second application.

Turning to the drawings, the following paragraphs provide an outline of a networked environment followed by a discussion of the operation of the same. FIG. 1 illustrates an example networked environment 10 for secure inter-application data sharing according to various examples described herein. The networked environment 10 includes a computing environment 100, a network 150, and a client device 160.

The computing environment 100 can be embodied as one or more computers, computing devices, or computing systems. In certain embodiments, the computing environment 100 can include one or more computing devices arranged, for example, in one or more server or computer banks. The computing device or devices can be located at a single installation site or distributed among different geographical locations. The computing environment 100 can include a plurality of computing devices that together embody a hosted computing resource, a grid computing resource, or other distributed computing arrangement. In some cases, the computing environment 100 can be embodied as an elastic computing resource where an allotted capacity of processing, network, storage, or other computing-related resources varies over time. As further described below, the computing environment 100 can also be embodied, in part, as certain functional or logical (e.g., computer-readable instruction) elements or modules as described herein.

The computing environment 100 can function as a management service for the client device 160, among other devices. In that context, the computing environment 100 includes a data store 120 and a management service 130. The data store 120 includes areas in memory for the storage of device data 122 and management data 124, among other types of data. The management service 130 includes an enrollment service 132 among other functional components.

The enrollment service 132 can enroll the client device 160 for device management services. To begin enrollment, the enrollment service 132 can identify and authenticate the client device 160 and store data related to the client device 160 in the device data 122 for later reference. In some cases, the management service 130 (or a management agent executing on the client device 160) can also be registered as a device administrator (at least in part) of the client device 160, permitting the management service 130 to configure and manage certain operating aspects of the client device 160.

Once the client device 160 is enrolled for device management by the management service 130, the management service 130 can direct the installation of various software components or applications on the client device 160. The software components can be configured on the client device 160 at the direction of the management service 130. Such software components can include, for example, applications, resources, libraries, and other related components. The management service 130 can also transfer various management policies, compliance rules, and configuration data for execution by and/or enforcement on the client device 160. In that context, during or after enrollment, the management service 130 can retrieve a set of management policies, compliance rules, and configuration data for the client device 160 from the management data 124 and transfer those policies, rules, and data to the client device 160 for reference by the operating system and certain applications executing on the client device 160.

Among other policies and rules, the management data 124 can define an authentication or access mode associated with the use of a suite of managed applications executing on the client device 160. As one example, the authentication mode can define a SSO access policy for a suite of managed applications, which can be a suite of SSO-enabled applications, executing on the client device 160. The authentication mode can specify the conditions under which access to the SSO-enabled applications is granted or denied based on device geolocation, network connection, operating system status (e.g., whether a device has been jailbroken), and other factors related to the client device 160. One factor related to whether access to the SSO-enabled applications is permitted rests upon the mode of authentication required to use the SSO-enabled applications.

The authentication mode can specify a set of SSO session credentials, such as a type of username and password, PIN, token, biometric identifier, or other access code or credential required for access to the managed, SSO-enabled applications. The authentication mode can also specify an SSO session time limit or timeout during which an SSO session is valid. As examples, the SSO session time limit can be 15, 30, 60, or 120 minutes, although any suitable timeframe can be used. The time limit can also be measured by the occurrence of various system events. For example, the time limit can be triggered when a device is restarted or rebooted, enters an areas considered insecure (e.g., by geolocation or detaching from a trusted wireless network), every number of times that a user accesses one or more applications, or other system occurrences. In that context, after the expiry of the SSO session time limit, one or more of the SSO-enabled applications can request the re-entry of an access code or other SSO session credentials by a user for continued access to the SSO-enabled applications.

The network 150 can include the Internet, intranets, extranets, wide area networks (WANs), local area networks (LANs), wired networks, wireless networks, cable networks, satellite networks, other suitable networks, or any combinations thereof. As one example, the computing environment 100 and the client device 160 can be respectively coupled to one or more public or private LANs or WANs and, in turn, to the Internet for communication of data among each other. Although not shown in FIG. 1, the network 150 can also include communicative connections to any number and type of network hosts or devices, such as website servers, file servers, cloud computing resources, databases, data stores, or any other network or computing architectures.

In the networked environment 10, the computing environment 100 and the client device 160 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The client device 160 is representative of one or more client devices. The client device 160 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client device 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client device 160.

As illustrated in FIG. 1, the client device 160 includes a data store 162, having areas for the storage of management data 164 and a shared memory 166, among others. The client device 160 also includes the applications 170 and 180, which are installed and configured for use on the client device 160, and the secure enclave processor 190. According to the concepts described herein, the applications 170 and 180 (among others) are members of a group of SSO-enabled applications. The group of SSO-enabled applications can be identified through a single common or recognized set of certificates, digital signatures, or other techniques as being developed by a common developer, for example, or based on other related factors.

The management data 164 can include a set of management policies, compliance rules, and configuration data received for device management of the client device 160 from the computing environment 100 as described above. The shared memory 166 can include a memory area for data sharing among certain applications executing on the client device 160, including the applications 170 and 180, among others. The shared memory 166 can be embodied as a type of file share or keychain memory for the applications 170 and 180. In that context, the shared memory 166 can store a number of tokens, certificates, application keys, account information, and other sign-on or access-related data to be accessed by (and transferred between) the applications 170 and 180.

As described above, any data elements stored in the shared memory 166 for transfer and access between the applications 170 and 180 are first encrypted by one of the applications 170 and 180 using a cryptographically-strong master key generated during the installation and/or configuration of the applications 170 and 180. Among other data elements, the shared memory 166 can store a copy of the master key encrypted by an access interval key, a copy of the master key encrypted by a session key, encrypted copies of the access interval key for the applications 170 and 180, respectively, and a number of encrypted copies of asymmetric keys of the applications 170 and 180.

The applications 170 and 180 are representative of applications, application extensions, or other application-related components that can be executed on the client device 160. The applications 170 and 180 can include hypertext-based network browsers, such as the Internet Explorer®, Firefox®, Chrome®, Safari®, or Silk® browsers, among other types of browsers. Alternatively, the applications 170 and 180 can be embodied as other types of applications, such as an e-mail clients, messaging clients, document editors or viewers, file browsers, or other applications or application extensions for other purposes.

The application 170 includes a sign on service 172, a key pair generator 174, and a key pair 176. Similarly, the application 180 includes a sign on service 182, a key pair generator 184, and a key pair 186. Among other functions, the sign on service 172 is configured to facilitate inter-application workflows between the applications 170, 180, and others on the client device 160. The sign on service 172 can determine whether a current SSO session among the applications 170 and 180 is valid and, if so, retrieve data from and store data to the shared memory 166. The data can include tokens, certificates, application keys, account information, and other data needed to facilitate inter-application workflows.

In some inter-application workflows, the sign on service 172 can retrieve an encrypted access interval key from the shared memory 166 and decrypt the access interval key using a private key of the key pair 176. The sign on service 172 can also retrieve an encrypted master key from the shared memory 166 and decrypt the master key using the access interval key. Once decrypted, the master key can be used to decrypt other data elements stored in the shared memory 166, such as data elements stored in the shared memory 166 by the application 180. The sign on service 182, key pair generator 184, and key pair 186 of the application 180 function and serve similar purposes as the sign on service 172, key pair generator 174, and key pair 176 of the application 170. In some cases, the functions of the sign on service 172 and the sign on service 182 can be combined and executed separately from the applications 170 and 180. Similarly, in some cases, the functions of the key pair generator 174 and the key pair generator 184 can be combined and executed separately from the applications 170 and 180.

The secure enclave processor 190 can be embodied as a security coprocessor of the client device 160. Among other functions, the secure enclave processor 190 is configured to securely store data, such as copies of the key pairs 176 and 186, in a secure memory area. The memory of the secure enclave processor 190 can be made accessible to the applications 170 and 180 through a biometric input (e.g., touch ID fingerprint reader) or other suitable access key or credential. In certain cases, the applications 170 and 180 can retrieve a copy of the key pairs 176 and 186, among other data, from the secure enclave processor 190.

FIG. 2 illustrates a representative example of data elements stored in the shared memory 166 of the client device 160. In FIG. 2, data element identifiers (e.g., IDs), data elements, and descriptive notes are shown in three respective columns. The data elements are representative and presented as examples for context. Not all of the data elements shown in FIG. 2 are necessary (or used) in all cases. Additionally, the data elements shown in FIG. 2 are not exhaustive as other data elements can be stored in the shared memory 166 and accessed by the applications 170 and 180, among others, executing on the client device 160.

In the example provided in FIG. 2, the shared memory 166 includes a first encrypted master key 200 and a second encrypted master key 201. Both the first encrypted master key 200 and the second encrypted master key 201 are encrypted instances of the same master key generated when the applications 170 and 180, among others, are installed and configured for use on the client device 160. The master key can be generated by a random number generation service executing on the client device 160, for example, or any other cryptographically-strong random or pseudorandom number or key generation process. In certain cases, when the master key is generated, a copy of the master key is communicated to the computing environment 100 over the network 150 and stored for future reference. For security reasons, the master key is not stored anywhere on the client device 160 in plaintext form. Instead, the master key can be encrypted before being stored in the shared memory 166.

The first encrypted master key 200 is encrypted by an access interval key for security. The access interval key can be a crypt key generated by a key derivative function based on an access code entered by a user, a session key generated by a random number generation service, or another key generated by any suitable key generation function or process. In any case, if the second encrypted master key 201 is relied upon, the second encrypted master key 201 can be encrypted by a key other than the access interval or crypt keys, such as the session key. In some cases, the second encrypted master key can be stored in and can considered part of the SSO session map 220. The applications 170 and 180 can access the master key by decrypting the first encrypted master key 200 with the access interval key or by decrypting the second encrypted master key 201 by the session key.

The shared memory 166 also includes shared data elements 210, the SSO session map 220, and a key pair map 250. The shared data elements 210 include a number of encrypted data elements 211-21N, each being encrypted by the master key. The encrypted data elements 211-21N can include tokens, certificates, application keys, account information, and other data shared between the applications 170 and 180, among others. For security in data transfer, before storing any data element in the shared memory 166, it is encrypted by one of the applications 170 and 180 using the master key. Consistent with that construct, when one of the encrypted data elements 211-21N is retrieved from the shared memory 166 it must be decrypted using the master key. Thus, access to the contents of the shared data elements 210 can depend upon the ability to decrypt at least one of the first encrypted master key 200 or the second encrypted master key 201.

Among others, the SSO session map 220 includes an SSO session time 230, a number of public keys 241-24N corresponding, respectively, to individual SSO-enabled applications installed on the client device 160, and a number of encrypted access interval keys 251-25N. As described in further detail below, the SSO session time 230 includes data that indicates a timeframe regarding a current SSO session. For example, the SSO session time 230 can indicate an absolute or relative time at or during which the current SSO session started, continues, or ends. When starting or opening the application 170, for example, the sign on service 172 can reference the SSO session time 230 to determine whether the current SSO session is valid. When the current SSO session is valid, the sign on service 172 can retrieve the encrypted access interval key 251, for example, to check for an encrypted copy of the access interval key. Depending upon the SSO workflow, the encrypted access interval key 251 can include a copy of the access interval key that was encrypted by the public key of the key pair 176 of the application 170 and stored in the SSO session map 220 by another SSO-enabled application.

Each of the public keys 241-24N is a public key portion of an asymmetric key pair held by one of the SSO-enabled applications, such as the applications 170 and 180, installed on the client device 160. For example, the public key 241 includes the public key portion of the key pair 176, and the public key 242 includes the public key portion of the key pair 186. Each of the encrypted access interval keys 251-25N is an instance of the access interval key encrypted by a respective one of the public keys 221-22N.

Depending upon the state of the current SSO session (e.g., current, valid, expired, invalid, etc.), any SSO-enabled application on the client device 160 can retrieve a corresponding one of the encrypted access interval keys 231-23N and decrypt it with its private key to obtain a copy of the access interval key. Thus, each of the SSO-enabled applications installed on the client device 160 can retrieve its corresponding encrypted access interval key 231-23N during a current, valid SSO session to decrypt a copy of the access interval key (provided it was previously stored there by another SSO-enabled application). As described above and in further detail below, the access interval key can be used to decrypt one or both of the first encrypted master key 200 and the second encrypted master key 201. In turn, the master key can be used to decrypt the encrypted data elements 211-21N.

As noted above, when starting or opening the application 170, for example, the sign on service 172 can reference the SSO session time 230 (among other factors) to determine whether the current SSO session has expired or not. The length of any given SSO session can be configured according to the authentication mode requirements of the client device 160, which can be defined the management service 130 using policies or rules. Beyond referencing the SSO session time 230, the sign on service 172 can determine whether the current SSO session has ended because a user of the client device 160 logged out of one or more of the SSO-enabled applications on the client device 160. The sign on service 172 can also determine whether certain management policies, compliance rules, or configuration data has changed on the client device 160, ending the current SSO session. Additionally or alternatively, the sign on service 172 can determine whether a check-in notification has been received from the management service 130 of the computing environment 100, potentially ending the current SSO session.

In any case, if the sign on service 172 (or the sign on service 182) determines that the current SSO session is invalid for any reason, it can clear or delete certain data elements from the shared memory 166. For example, the sign on service 172 can clear or delete the second encrypted master key 201, the SSO session time 230, and the encrypted access interval keys 251-25N from the shared memory 166. In doing so, the SSO-enabled applications on the client device 160 are no longer able to retrieve and decrypt copies of the access interval key or the master key. Instead, the sign on service 172 (or sign on service of another SSO-enabled application) can prompt the user of the client device 160 to enter the access code, which can be a user's username and password, PIN number, biometric identifier, or other access code or credentials. Upon a valid entry of the access code by the user, the sign on service 172 can regenerate one or more of the access interval key, crypt key, and/or session key. In turn, the sign on service 172 can also access the first encrypted master key 200 and repopulate the SSO session time 230 with new SSO session timeframe information. Additionally, the sign on service 172 can also repopulate the encrypted access interval keys 251-25N for itself and the other SSO-enabled applications, enabling a new SSO session.

The key pair map 260 includes a number of encrypted key pairs 271-27N, respectively, for the SSO-enabled applications installed on the client device 160. For example, the encrypted key pair 271 can be an encrypted instance of the key pair 176 from the working memory of the application 180, and the encrypted key pair 27N can be an encrypted instance of the key pair 186 from the working memory of the application 180.

As described in further detail below, because asymmetric key pairs can be relatively time consuming to generate, the key pair map 260 provides an additional option for SSO-enabled applications to store and safeguard copies of asymmetric key pairs. The encrypted key pairs 271-27N can be encrypted, in various cases, by the master key, the access interval key, the crypt key, the session key, or another suitable encryption key. The asymmetric key pairs used by the SSO-enabled applications can also be securely stored in the secure enclave processor 190 and/or by the computing environment 100 in some cases. Additionally, if necessary, asymmetric key pairs can be regenerated by the SSO-enabled applications. For example, the key pair 176 can be generated by the key pair generator 174, and the key pair 186 can be generated by the key pair generator 184.

Figure 3A:
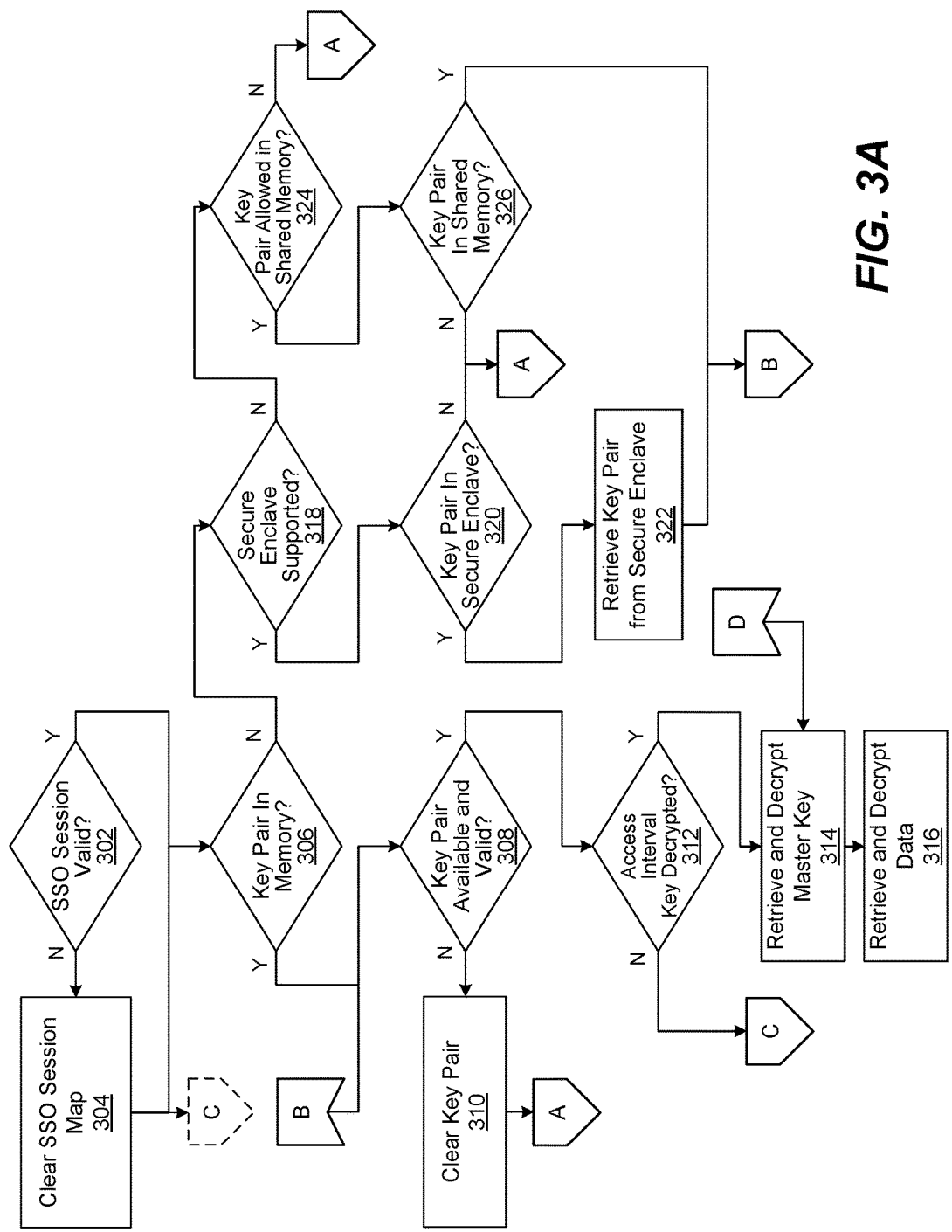
FIG. 3A illustrates a process for secure inter-application data sharing according to various examples described herein.
Figure 3B:
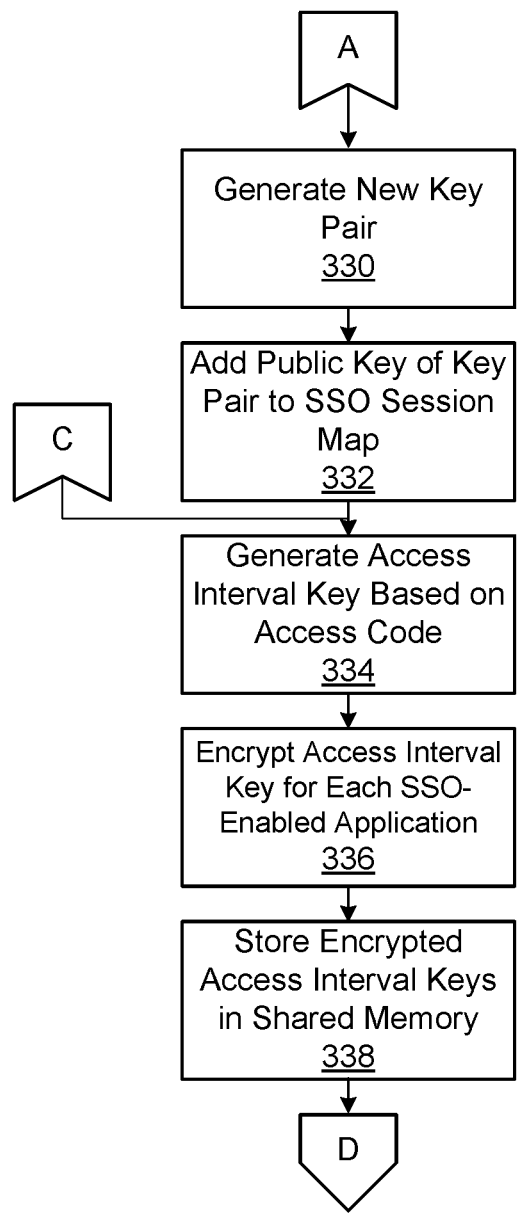
FIG. 3B further illustrates the process for secure inter-application data sharing shown in FIG. 3A according to various examples described herein.

FIGS. 3A-3B illustrate a process for secure inter-application data sharing according to various examples described herein. The process shown in FIGS. 3A-3B can be performed by one SSO-enabled application to facilitate inter-application workflows between a number other of SSO-enabled applications. The process is described in connection with the application 170 of the client device 160 shown in FIG. 1, although other SSO-enabled applications, including the application 180, can perform the process. Although the flowcharts show an order of execution, the order of execution can differ from that which is shown. For example, the order of execution of two or more elements can be switched relative to the order shown or as described below. Also, two or more elements shown in succession can be executed concurrently or with partial concurrence. Further, in some examples, one or more of the elements shown in the flowcharts can be skipped or omitted.

At step 302, the process can include the sign on service 172 determining whether the current SSO session is valid. The sign on service 172 can determine whether the current SSO session is valid, for example, when the application 170 is opened for use or brought to the forefront of the user interface display of the client device 160. At that (or any other applicable time), the sign on service 172 can reference the SSO session time 230 (among other factors) in the shared memory 166 to determine whether the current SSO session has expired or not. The length of any given SSO session can be configured according to the authentication mode requirements of the client device 160, which can be defined the management service 130 using policies or rules.

Beyond referencing the SSO session time 230, the sign on service 172 can also determine at step 302 whether the current SSO session has ended because a user of the client device 160 logged out of one or more of the SSO-enabled applications on the client device 160. The sign on service 172 can also determine at step 302 whether certain management policies, compliance rules, or configuration data has changed on the client device 160, ending the current SSO session. Additionally or alternatively, the sign on service 172 can determine at step 302 whether a check-in notification has been received from the management service 130 of the computing environment 100, potentially ending the current SSO session. If the current SSO session is not valid, then the process can proceed to step 304. Otherwise, if the current SSO session is valid, then the process can proceed to step 306.

At step 304, when the current SSO session is not valid, the process can include the sign on service 172 clearing or deleting certain data elements from the shared memory 166, such as data elements in the SSO session map 220. For example, the sign on service 172 can clear or delete the second encrypted master key 201, the SSO session time 230, and the encrypted access interval keys 251-25N from the shared memory 166. In doing so, the SSO-enabled applications on the client device 160 will no longer be able to retrieve and decrypt copies of the access interval key or the master key from the shared memory 166, and the current SSO session is locked, closed, and/or ends. For access to the functions of the SSO-enabled applications installed on the client device 160 from this point, a new SSO session must be started. To start a new SSO session, the process flow can proceed to step 306. Alternatively, in some cases, the process can proceed directly from step 304 to step 334 in FIG. 3B, as designated by the off-page reference "C" in FIG. 3A.

At step 306, the process includes the sign on service 172 determining whether a key pair 176 is available in running memory of the application 170. The key pair 176 may not be available in the running memory of the application 170 if it was previously killed from execution on the client device 160 or other reasons. Otherwise, if the application 170 has been executing and is resident in running memory, the key pair 176 (or at least the private portion of the key pair 176) may be available in the running memory of the application 170. If the key pair 176 is available, then the process can proceed to step 308. Otherwise, the process can proceed to step 318.

At step 308, the process includes the sign on service 172 determining whether the key pair 176 in the running memory of the application 170 and/or the public key 241 stored in the shared memory 166 are valid. The public key 241 stored in the shared memory 166 is the public key portion of the key pair 176, which is an asymmetric key pair including public and private key portions. Thus, to determine whether the key pair 176 or the public key 241 are valid, the sign on service 172 can encrypt and decrypt test data using the public key 241 from the shared memory 166 and the private key portion of the key pair 176. If the test data is not returned intact (e.g., is garbled, destroyed, or lost) during the encryption/decryption test, then the key pair 176 and public key 241 portion of the key pair 176 can be considered invalid and unusable. In that case, the process can proceed to step 310. Otherwise, if the test data is returned intact from the encryption/decryption test, then the key pair 176 and public key 241 portion of the key pair 176 can be considered to be valid and usable, and the process can proceed to step 312.

At step 310, if the key pair 176 in the running memory was determined to be invalid, the process includes the sign on service 172 clearing or deleting the key pair 176 from the running memory of the application 170. The process can also include the sign on service 172 clearing or deleting the public key 241 of the application 170 from the shared memory 166. Here, the key pair 176 and/or the public key 241 are cleared because they are not suitable for use in the secure transfer of the access interval key (or any other data) between SSO-enabled applications using the shared memory 166.

At step 312, the process includes the sign on service 172 determining whether the encrypted access interval key 251 can be decrypted using the private key portion of the key pair 176 stored in running memory of the application 170. To that end, the sign on service 172 can retrieve the encrypted access interval key 251 from the shared memory 166 and decrypt it using the private key portion of the key pair 176. If a previously-stored copy of the access interval key is obtained through that retrieval and decryption process, then the process can proceed to step 314 to unlock the master key. Otherwise, if no previously-stored copy of the access interval key is decrypted from the encrypted access interval key 251, then the process can proceed to step 334 in FIG. 3B, as designated by the off-page reference "C" in FIG. 3A.

At step 314, the process includes the application 170 retrieving one or both of the first encrypted master key 200 or the second encrypted master key 201 from the shared memory 166. The process also includes the application 70 decrypting the first master key 200 and/or the second encrypted master key 201 using the access interval key decrypted at step 312, to arrive at a copy of the master key. As described above, the access interval key (if encrypted and stored in the SSO session map 220) was previously generated as either a crypt key using a key derivative function based on an access code entered by a user or generated as a session key using a random number generation service. In some cases, depending upon whether the access interval key decrypted at step 312 includes or comprises the crypt key or the session key, the application 170 may decrypt one of the first encrypted master key 200 or the second encrypted master key 201. In either case, the application 170 obtains a copy of the master key at step 314.

At step 316, the process includes the application 170 retrieving one or more of the encrypted data elements 211-21N from the shared memory 166. The application can also decrypt the encrypted data elements 211-21N using the master key obtained at step 314. The decrypted data elements can include tokens, certificates, application keys, account information, and other data shared between SSO-enabled applications as described herein. As described herein, those decrypted data elements can facilitate the extension of an SSO session between SSO-enabled applications executing on the client device 160.

Among steps 302, 306, 308, 312, 314, and 316, it might not have been necessary for the application 170 to prompt a user of the client device 160 to enter an access code to gain access to the data elements stored in the shared memory 166. Instead, based on a previous entry of the access code by a user when using the application 180, for example, the encrypted access interval key 251 was stored in the shared memory 166 for use by the application 170 at a later time (and so long as the current SSO session is still valid). In other words, by the generation and exchange of the access interval key through the SSO session map 220 by one SSO-enabled application, other SSO-enabled applications are also able to access the access interval key. In turn, other SSO-enabled application can access the master key and the shared data elements 210.

Mainly, two other paths can be taken according to the process shown in FIG. 3A. First, the application 170 can determine that the key pair 176 is unavailable in running memory at step 306. In that case, the process can proceed from step 306 to step 318 to obtain a copy of the key pair 176 or to regenerate a new version of the key pair 176. Second, the application 170 can determine that, although the current SSO session is valid and the key pair 176 is available in running memory, the access interval key cannot be decrypted from (e.g., is not present in) the encrypted access interval key 251. In that case, the process can proceed to step 334 in FIG. 3B.

If the application 170 determines that the key pair 176 is unavailable in running memory at step 306, then the process can proceed to step 318. As discussed above, the secure enclave processor 190 can be embodied as a security coprocessor for storing sensitive data, but security coprocessors might not be present in all client devices in which the application 170 can be executed. Thus, at step 318, the process can include the application 170 determining whether the secure enclave processor 190 is available, supported, and/or used in the client device 160. If so, then the process can proceed to step 320. Otherwise, the process can proceed to step 324.

At step 320, the process includes the application 170 determining whether a copy of the key pair 176 is stored in the secure enclave processor 190. For example, the application 170 can reference the management data 164 for an indication as to whether asymmetric key pairs were previously stored in the secure enclave processor 190 for later reference. As discussed above, the secure enclave processor 190 can be embodied as a security coprocessor of the client device 160 configured to securely store data, such as copies of the key pairs 176 and 186.

If a copy of the key pair 176 is stored in the secure enclave processor 190, then the process can proceed to step 322. At step 322, the process includes the application 170 retrieving the copy of the key pair 176 from the secure enclave processor 190 (potentially based on a touch ID fingerprint read, etc.) and placing the key pair 176 into running memory of the application 170. After step 322, the process can proceed back to step 308 to determine whether the key pair 176, which is now in the running memory of the application 170, is valid for use. On the other hand, if a copy of the key pair 176 is not stored in the secure enclave processor 190, then the process can proceed to step 330 in FIG. 3B.

If the secure enclave processor 190 is not supported or available, the process can proceed from step 318 to step 324. At step 324, the process includes the application 170 determining whether a copy of the key pair 176 is permitted to be stored in the shared memory 166. The ability of the application 170 and other SSO-enabled applications to store key pairs in the shared memory 166 can be configurable based on the device management policies or rules for the client device 160. As described above, those policies or rules can be configured and enforced by the management service 130, for example. To that end, the application 170 can reference the device management policies or rules stored in the management data 164 to determine whether a copy of the key pair 176 is permitted to be stored in the shared memory 166. If encrypted copies of key pairs are permitted to be stored in the shared memory 166, then the process can proceed to step 326. Otherwise, the process can proceed to step 330 in FIG. 3B.

At step 326, the process includes the application 170 determining whether an encrypted copy of the key pair 176 is stored in the key pair map 260 in the shared memory 166. To that end, the sign on service 172 can retrieve the encrypted key pair 271 from the shared memory 166 and decrypt it using the private key portion of the key pair 176. If a previously-stored copy of a key pair for the application 170 is obtained through that retrieval and decryption process, then the process can proceed to step 308 to determine if the copy of the key pair is valid and usable. Otherwise, if no previously-stored copy of the key pair is decrypted from encrypted key pair 271, then the process can proceed to step 330 in FIG. 3B to generate a new key pair, as designated by the off-page reference "A" in FIG. 3A.

Turning to FIG. 3B, at step 330, the process includes the key pair generator 174 generating a new key pair 176. In one example, the key pair 176 can be generated as Rivest, Shamir, Adleman (RSA) public/private key pair of any suitable length, such as 512, 1024, or 2048 bits, in various cases, although other key generation algorithms and key sizes can be used. Because it can take a relatively long time to generate a cryptographically-strong key pair 176, steps 318, 320, 322, 324, 326, and 328 are directed to obtaining a copy of the key pair 176 that might have been previously generated and stored by the application 170 (or some other process or application). However, if no other copy of the key pair 176 is available, the key pair generator 174 can generate a new copy of the key pair 176 at step 330.

At step 332, the process includes the key pair generator 174 adding the public key portion of the key pair 176 to the SSO session map 220. Particularly, the key pair generator 174 can store the public key portion of the key pair 176 in the shared memory 166 as the public key 241. In addition to the application 170, other SSO-enabled applications will then have access to the public key 241 of the application 170. The application 170 and others can then encrypt data elements, such as a valid, current access interval key, using the public key 241. The encrypted access interval key can be stored in the shared memory 166 as the encrypted access interval key 251.

At step 334, the process includes the sign on service 172 generating an access interval key. To that end, the sign on service 172 can prompt a user of the client device 160 to enter an access code. The access code can be a user's username and password, PIN number, biometric identifier, or other access code or credentials. Upon a valid entry of the access code by the user, the sign on service 172 can then generate the access interval key. In one case, the access interval key can be generated as a crypt key by a key derivative function executing on the client device 160, using the user's access code as a seed to key derivative function. Additionally or alternatively, the access interval key can be generated as a session key by a random number generator executing on the client device 160. The access interval key is not limited to being generated by any particular key derivative function or random number generator, however. Instead, the access interval key can be generated using any cryptographically-strong key generation process (e.g., strong enough for the type of data being protected), with or without the user's access code being used as a seed.

At step 336, the process includes the sign on service 172 encrypting the access interval key generated at step 334 for each SSO-enabled application on the client device 160. For the application 180, for example, the sign on service 172 retrieves the public key 242 of the application 180 from the SSO session map 220 in the shared memory 166 and encrypts the access interval key by the public key 242. Similarly, the sign on service 172 also retrieves the public keys of any other SSO-enabled applications executing on the client device 160 and encrypts the access interval key by the public keys of those applications.

At step 338, the process includes the sign on service 172 storing the encrypted copies of the access interval key from step 336 into the SSO session map 220, as the encrypted access interval keys 251-25N. For example, the copy of the access interval key which is encrypted by the public key 242 is stored in the SSO session map 220 as the encrypted access interval key 252. Similarly, other encrypted copies of the access interval key are stored, respectively, for the other SSO-enabled applications executing on the client device 160.

Once the encrypted access interval keys 251-25N are stored in the SSO session map 220, the SSO-enabled applications executing on the client device 160 can retrieve and decrypt them to access a copy of the access interval key. The access interval key, in turn, can be used to decrypt one or both of the first encrypted master key 200 and a second encrypted master key 201. Finally, the master key can be used to decrypt the encrypted data elements 211-21N. Thus, by the application 170 storing the encrypted access interval keys 251-25N in the SSO session map 220, the other SSO-enabled applications are able to access the encrypted data elements 211-21N.

After step 328, the process can include the application retrieving and decrypting the master key at step 314 in FIG. 3A. Particularly, the application 170 can retrieve and decrypt a copy of the master key at step 314, as described above, using the access interval key generated at step 334. Further, the application 170 can retrieve one or more of the encrypted data elements 211-21N from the shared memory 166 at step 316 and decrypt the encrypted data elements 211-21N using the master key obtained at step 314.

Figure 4A:
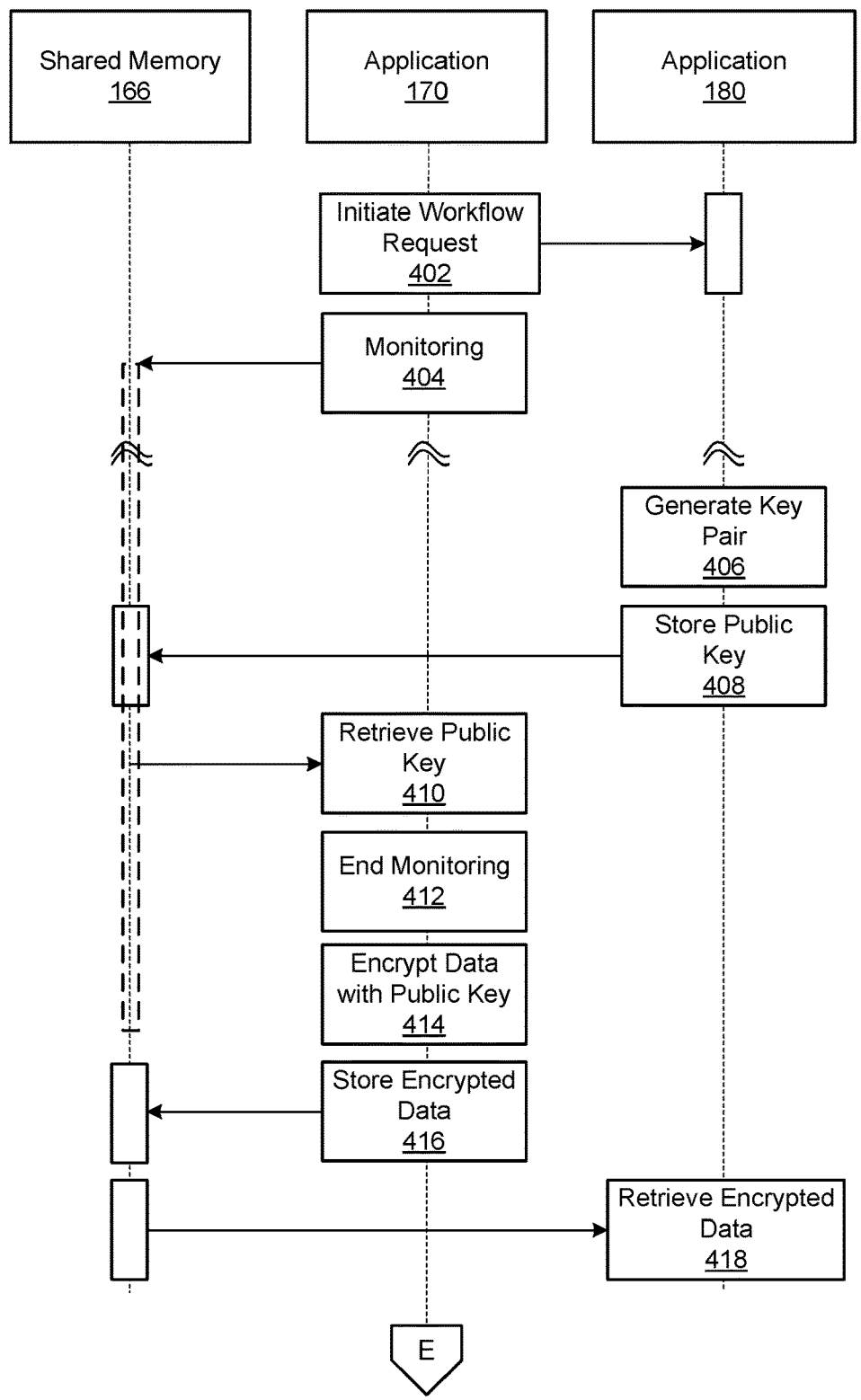
FIG. 4A illustrates another process for secure inter-application data sharing according to various examples described herein.
Figure 4B:
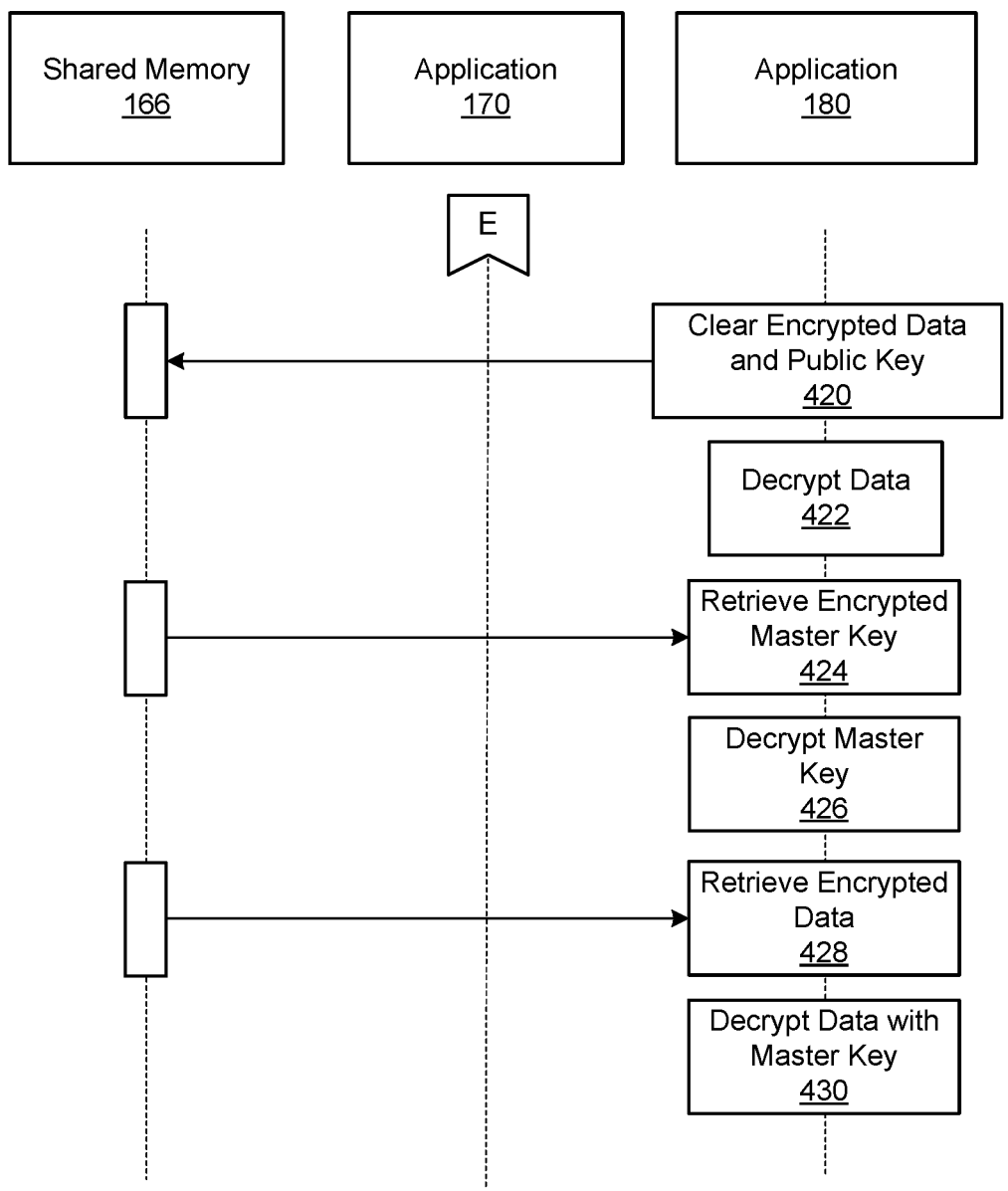
FIG. 4B further illustrates the process for secure inter-application data sharing shown in FIG. 4A according to various examples described herein.

FIGS. 4A-4B illustrate another process for secure inter-application data sharing according to various examples described herein. As compared the process illustrated in FIGS. 3A-3B, the process shown in FIGS. 4A-4B is directed to enabling an inter-application workflow between two applications rather than among a full suite of SSO-enabled applications. The process is described in connection with the applications 170 and 180, although other SSO-enabled applications on the client device 160 can perform the process. Although the flowcharts show an order of execution, the order of execution can differ from that which is shown. For example, the order of execution of two or more elements can be switched relative to the order shown or as described below. Also, two or more elements shown in succession can be executed concurrently or with partial concurrence. Further, in some examples, one or more of the elements shown in the flowcharts can be skipped or omitted.

At step 402, the process can include the application 170 initiating an inter-application workflow request to the application 180. As one example, a user of the client device 160 can view an e-mail in the application 170 and open a link in the e-mail. However, the application 170 might not include the functions of a browser application. In that case, it might be necessary to switch to the application 180, which can be a browser application, to retrieve, render, and display a network page based on the link in the e-mail.

If the application 180 was previously closed and not resident in the running memory of the client device 160, then it might be necessary to open and load the application 180 into running memory. In that case, the application 180 might require one or more tokens, certificates, application keys, account information, or other access-related data before a user of the client device 160 can access certain features of the application 180. The application 170 can provide the access-related data to the application 180 by exchanging it through the shared memory 166.

To pass the access-related data from the application 170 to the application 180, the application initiates an inter-application workflow request to the second application 180 at step 402. Among other information, the workflow request can specify that a request is being made to open the link in the e-mail, for example, and identify one or more locations in the shared memory 166 for secure data sharing between the application 170 and the application 180. For example, the workflow request can identify one or more locations in the SSO session map 220 (or other locations) in the shared memory 166, such as the memory location for the public key 242 and the memory location for the encrypted access interval key 252.

At step 404, the process can include the application 170 monitoring one or more locations in the shared memory 166 for data from the application 180. The application 170 can initiate a new, separate task or processing thread for the monitoring at step 404, and the monitoring can conclude after data is securely transferred between the applications 170 and 180 at step 412 as described below. The application 170 can monitor the locations in the shared memory 166 that were identified in the workflow request initiated at step 402, among others. During the monitoring, the application 170 can seek to identify whether the application 180 has stored data in the shared memory 166 to be retrieved by the application 170. For example, the application 170 can monitor the shared memory 166 to determine whether the application 180 has stored the public portion of its key pair 186 in the public key 242 memory area.

At step 406, the process can include the application 180 generating the key pair 186. The key pair 186 can be generated as an RSA key pair of any suitable length, such as 512, 1024, or 2048 bits, in various cases, although other key generation algorithms and key sizes can be used. Because it can take a relatively long time to generate longer key pairs, a 1024 bit key pair 186 might be preferred as a balance between cryptographic strength and key generation time.

At step 408, the process includes the application 180 storing the public portion of the key pair 186 generated at step 406 in the shared memory 166. The application 180 can store the public portion of its key pair 186 in the public key 242 memory area. In other cases, the public portion of the key pair 186 can be stored in any suitable location within the shared memory 166 that is identified in the workflow request. From the public key 242 memory area (or other memory location), the application 170 can retrieve the public portion of the key pair 186 of the application 180.

At step 410, the process includes the application 170 identifying and retrieving the public portion of the key pair 186 of the application 180 from the shared memory 166. The application 170 can identify the public portion of the key pair 186 in the shared memory 166 based on the monitoring process started at step 404. At step 412, after the public portion of the key pair 186 of the application 180 is retrieved, the application 170 can end the monitoring process started at step 404. As compared to the process shown in FIGS. 3A-3B, which is directed to facilitating the exchange of SSO access-related data among a suite of SSO-enabled applications, the monitoring is started and ended for the secure communication of data between two particular applications, application extensions, or processes.

At step 414, the process can include the application 170 encrypting data for the application 180 using the public key of the application 180 retrieved at step 410. As one example, the application 170 can encrypt a key, such as one or more of the access interval, crypt, or session keys, at step 414. As another example, the application 170 can encrypt tokens, certificates, application keys, account information, or other access-related data at step 414. In still other cases, depending upon the sign-on requirements of the application 180, the application 170 can encrypt other types of data by the public key of the application 180 at step 414.

At step 416, the process includes the application 170 storing the data encrypted at step 416 into one or more memory areas in the shared memory 166. The encrypted data can be stored in the memory area for the encrypted access interval key 252, among other locations in the shared memory 166. By storing the encrypted data in the shared memory 166, the encrypted data can be made available to the application 180.

At step 418, the process can include the application 180 retrieving the encrypted data that was stored in the shared memory 166 by the application 170 at step 416. Based on the identification of one or more memory locations in the inter-application workflow request received at step 402, the application 180 can know where the data encrypted by the application 170 will be stored in the shared memory 166. For example, the application 180 can know to retrieve the encrypted data from the memory area for the encrypted access interval key 252, among other locations in the shared memory 166.

Turning to FIG. 4B, at step 420, the process can include the application 180 clearing, deleting, or overwriting the public key stored in the shared memory 166 by the application 180 at step 408. The process can also include the application 180 clearing the encrypted data stored in the shared memory 166 by the application 170 at step 416. In other cases, the application 170 can clear the public key and encrypted data from the shared memory 166 at step 420.

By clearing the public key and the encrypted data from the shared memory 166, the exchange of data between the applications 170 and 180 can be made more secure. For example, the public key of the application 180 will be stored in the shared memory 166 for only a limited period of time while the application 170 retrieves and uses it to encrypt data for the application 180. After that data exchange is complete, the public key of the application 180 can be cleared or removed from the shared memory 166, to prevent it from being retrieved by other applications.

At step 422, the process can include the application 180 decrypting the encrypted data retrieved at step 418. The application 180 can decrypt the encrypted data using the private portion of the key pair 186 generated at step 406. As described above, the decrypted data can include a key, such as one or more of the access interval, crypt, or session keys. The decrypted data can, alternatively or additionally, include tokens, certificates, application keys, account information, or other access-related data. If a key is decrypted at step 422, the application 180 can use the key to decrypt other data stored in the shared memory 166, including the master key.

At step 424, the process can include the application 180 retrieving an encrypted master key from the shared memory 166. For example, one or both of the first encrypted master key 200 and the second encrypted master key 201 can be retrieved from the shared memory 166. If the data decrypted at step 422 is an access interval, crypt, or session key, one or both of the first encrypted master key 200 and the second encrypted master key 201 can be decrypted by the application 180 using one or more of those keys.

At step 426, the process can include the application 180 decrypting one or both of the first encrypted master key 200 and the second encrypted master key 201 using the access interval, crypt, or session key decrypted at step 422. As described above, the shared memory 166 includes the shared data elements 210, which include a number of encrypted data elements 211-21N, each encrypted by the master key.

At step 428, the process can include the application 180 retrieving encrypted data from the shared memory 166, such as a number of encrypted data elements 211-21N, each encrypted by the master key. At step 430, the process can include the application 180 decrypting one of more of the encrypted data elements retrieved at step 428 using the master key decrypted at step 426. The decrypted data elements can include tokens, certificates, application keys, account information, and other data shared between the applications 170 and 180. As described herein, those decrypted data elements can facilitate the extension of a sign on session between the applications 170 and 180 executing on the client device 160.

In a variation on the processes shown in FIGS. 4A-4B, applications executing on the client device 160 can exchange data between each other using one or more inter-application sockets. In that case, after step 402, either or both of the applications 170 and 180 can open an inter-application socket, such as a Berkeley, Portable Operating System Interface (POSIX), or other application programming interface (API) socket. In that case, the applications 170 and 180 can exchange access related data, such as encryption keys, tokens, certificates, application keys, account information, and other sign-on or access-related data between each other using the sockets. After the data has been exchanged between them, one or both of the applications 170 and 180 can close the sockets.

The flowcharts in FIGS. 3A-3B and 4A-4B show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The computing environment 100 can include at least one processing circuit. Such a processing circuit can include, for example, one or more processors and one or more storage or memory that are coupled to a local interface. The local interface can include, for example, a data bus with an accompanying address/control bus or any other suitable bus structure. Similarly, the client device 160 can include at least one processing circuit. Such a processing circuit can include, for example, one or more processors and one or more storage or memory devices that are coupled to a local interface.

The storage or memory devices can store data or components that are executable by the processors of the processing circuit. For example, the management service 30 and/or other components can be stored in one or more storage devices and be executable by one or more processors in the computing environment 100. Similarly, the applications 170 and 180 and/or other components can be stored in one or more storage devices and be executable by one or more processors in the client device 160.

The management service 130, application 170, application 180, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 130, application 170, application 180, and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for secure data sharing between applications, comprising:
    initiating an inter-application workflow request from a first application to a second application, the workflow request identifying at least one memory location in a shared memory for secure data transfer between the first application and the second application;

monitoring the at least one memory location in the shared memory for presence of a public key of the second application, the public key of the second application being generated and stored in the at least one memory location by the second application in response to the workflow request;

in response to the public key of the second application being present in the shared memory, retrieving the public key from the shared memory;

encrypting an access interval key using the public key to provide an encrypted access interval key, the access interval key being associated with a sign on session of the first application; and storing the encrypted access interval key in the at least one memory location in the shared memory for retrieval by the second application to extend the sign on session to the second application.

2. The method according to claim 1, wherein:
the access interval key comprises a session key of the first application; and
the shared memory comprises a master key encrypted by the session key.

3. The method according to claim 2, wherein the shared memory comprises at least one data element encrypted by the master key, the at least one data element including data accessible by the second application through decryption using the master key during the sign on session of the first application.

4. The method according to claim 1, further comprising:
generating an asymmetric key pair, the asymmetric key pair comprising the public key and a private key of the second application; and
storing the public key of the second application in the at least one memory location in the shared memory in response to the workflow request.

5. The method according to claim 4, further comprising:
retrieving, by the second application, the encrypted access interval key from the shared memory; and
decrypting, by the second application, the encrypted access interval key using the private key of the second application.

6. The method according to claim 5, further comprising:
retrieving, by the second application, an encrypted master key from the shared memory; and
decrypting, by the second application, the encrypted master key, wherein the shared memory comprises at least one data element encrypted by the master key, the at least one data element including data accessible by the second application through decryption using the master key during the sign on session of the first application.

7. The method according to claim 5, further comprising, after retrieving the encrypted access interval key from the shared memory, clearing the public key and the encrypted access interval key from the shared memory.

8. A non-transitory computer-readable medium embodying program code executable in at least one computing device for secure data sharing between applications that, when executed by the at least one computing device, directs the at least one computing device to at least:
initiate an inter-application workflow request from a first application to a second application, the workflow request identifying at least one memory location in a shared memory for secure data transfer between the first application and the second application;

monitor the at least one memory location in the shared memory for presence of a public key of the second application, the public key of the second application being generated and stored in the at least one memory location by the second application in response to the workflow request;

in response to the public key of the second application being present in the shared memory, retrieve the public key from the shared memory;

encrypt an access interval key using the public key to provide an encrypted access interval key, the access interval key being associated with a sign on session of the first application; and store the encrypted access interval key in the at least one memory location in the shared memory for retrieval by the second application to extend the sign on session to the second application.

9. The non-transitory computer-readable medium according to claim 8, wherein:
the access interval key comprises a session key of the first application; and
the shared memory comprises a master key encrypted by the session key.

10. The non-transitory computer-readable medium according to claim 9, wherein the shared memory comprises at least one data element encrypted by the master key, the at least one data element including data accessible by the second application through decryption using the master key during the sign on session of the first application.

11. The non-transitory computer-readable medium according to claim 8, wherein the at least one computing device is further directed to at least:
generate an asymmetric key pair, the asymmetric key pair comprising the public key and a private key of the second application; and
store the public key of the second application in the at least one memory location in the shared memory in response to the workflow request.

12. The non-transitory computer-readable medium according to claim 11, wherein the at least one computing device is further directed to at least:
retrieve, by the second application, the encrypted access interval key from the shared memory; and
decrypt, by the second application, the encrypted access interval key using the private key of the second application.

13. The non-transitory computer-readable medium according to claim 12, wherein the at least one computing device is further directed to at least:
retrieve, by the second application, an encrypted master key from the shared memory; and
decrypt, by the second application, the encrypted master key, wherein the shared memory comprises at least one data element encrypted by the master key, the at least one data element including data accessible by the second application through decryption using the master key during the sign on session of the first application.

14. The non-transitory computer-readable medium according to claim 12, wherein the at least one computing device is further directed to at least clear the public key and the encrypted access interval key from the shared memory after the encrypted access interval key is retrieved from the shared memory.

15. A system for secure data sharing between applications, comprising:
a memory device configured to store computer-readable instructions thereon; and at least one processing device configured, through execution of the computer-readable instructions, to:
  initiate an inter-application workflow request from a first application to a second application, the workflow request identifying at least one memory location in a shared memory for secure data transfer between the first application and the second application;
  monitor the at least one memory location in the shared memory for presence of a public key of the second application, the public key of the second application being generated and stored in the at least one memory location by the second application in response to the workflow request;
  in response to the public key of the second application being present in the shared memory, retrieve the public key from the shared memory;
  encrypt an access interval key using the public key to provide an encrypted access interval key, the access interval key being associated with a sign on session of the first application; and
  store the encrypted access interval key in the at least one memory location in the shared memory for retrieval by the second application to extend the sign on session to the second application.

16. The system according to claim 15, wherein:
the access interval key comprises a session key of the first application; and
the shared memory comprises a master key encrypted by the session key.

17. The system according to claim 16, wherein the shared memory comprises at least one data element encrypted by the master key, the at least one data element including data accessible by the second application through decryption using the master key during the sign on session of the first application.

18. The system according to claim 15, wherein the at least one processing device is further configured to at least:
  generate an asymmetric key pair, the asymmetric key pair comprising the public key and a private key of the second application; and
  store the public key of the second application in the at least one memory location in the shared memory in response to the workflow request.

19. The system according to claim 18, wherein the at least one processing device is further configured to at least:
  retrieve, by the second application, the encrypted access interval key from the shared memory; and
  decrypt, by the second application, the encrypted access interval key using the private key of the second application.

20. The system according to claim 19, wherein the at least one processing device is further configured to at least clear the public key and the encrypted access interval key from the shared memory after the encrypted access interval key is retrieved from the shared memory.

* * * * *